United States Patent [19]

Piotrowski

[11] 4,094,521

[45] June 13, 1978

[54] COLLET CHUCK

[75] Inventor: Charles Piotrowski, Suttons Bay, Mich.

[73] Assignee: Sheffer Collet Company, Traverse City, Mich.

[21] Appl. No.: 761,127

[22] Filed: Jan. 21, 1977

[51] Int. Cl.² .............................................. B23B 31/20
[52] U.S. Cl. .......................................... 279/4; 279/50
[58] Field of Search ................... 279/4, 43, 50, 57, 74

[56] References Cited
U.S. PATENT DOCUMENTS

| | | | |
|---|---|---|---|
| 3,451,314 | 6/1969 | Smrekar | 279/4 |
| 3,599,998 | 8/1971 | Kiwalle | 279/4 |
| 3,692,320 | 9/1972 | Lindelof et al. | 279/4 |

Primary Examiner—Gil Weidenfeld
Attorney, Agent, or Firm—Price, Heneveld, Huizenga & Cooper

[57] ABSTRACT

A collet chuck includes a body having a spindle adapter secured to one end and a collet retaining ring at the opposite end for holding a collet in place in the chuck. Stationary slip ring and piston assemblies are mounted to the rotatable body by bearings and include a hydraulically operated piston movable axially to engage an actuator having a camming surface engaging the collet. A plurality of springs extend between the body and the axially movable actuator for providing clamping pressure to the collet. The hydraulic piston operates in opposition to the springs for releasing the clamping pressure on the collet.

23 Claims, 4 Drawing Figures

FIG I

COLLET CHUCK

BACKGROUND OF THE PRESENT INVENTION

The present invention relates to collet chucks and in particular to improved structure for increasing the clamping pressure of such chucks.

In the prior art, many collet chucks have been mechanically operated between clamping and releasing positions by a toggle and drawbar system. More recently, pneumatically operated collet chucks have been provided in which a pneumatic cylinder urges the collet between clamping and releasing positions. With such prior art systems, the size of the chuck as well as the chucking pressure on a workpiece is significantly limited in the case of feed through type chucks. This in turn limits the size of a workpiece which can be accommodated as well as the speed of rotation.

There exists therefore a need for an improved collet chuck which can handle relatively large diameter workpieces which must be rotated at relatively high speeds.

SUMMARY OF THE INVENTION

The collet chuck of the present invention overcomes the limitations of the prior art by providing a hydraulically operated mechanism for the chuck by which an axially movable actuator is held in a clamping position against the collet by a plurality of heavy-duty springs for providing a significantly high clamping pressure which can be released by the counteraction of a hydraulically operated piston urging the actuator in a direction to compress the clamping springs and relieve the compressive pressure on the collet. The hydraulic piston is part of a stationary assembly mounted to a machine tool while the body of the collet chuck is rotatably mounted to the stationary assembly for rotation of the workpiece by a drive spindle coupled to the body of the chuck.

Apparatus of the present invention includes these features and is capable of relatively high speed rotation of a relatively large workpiece held at significantly high clamping pressures. The many features of the present invention and its advantages over the prior art can best be understood by reference to the following description thereof together with the drawings in which:

DETAILED DESCRIPTION OF THE PREFERRED EMBODIMENT

Before describing in detail the construction of the collet chuck, a brief description of the interrelationship of the various assemblies is presented.

Figure 1:
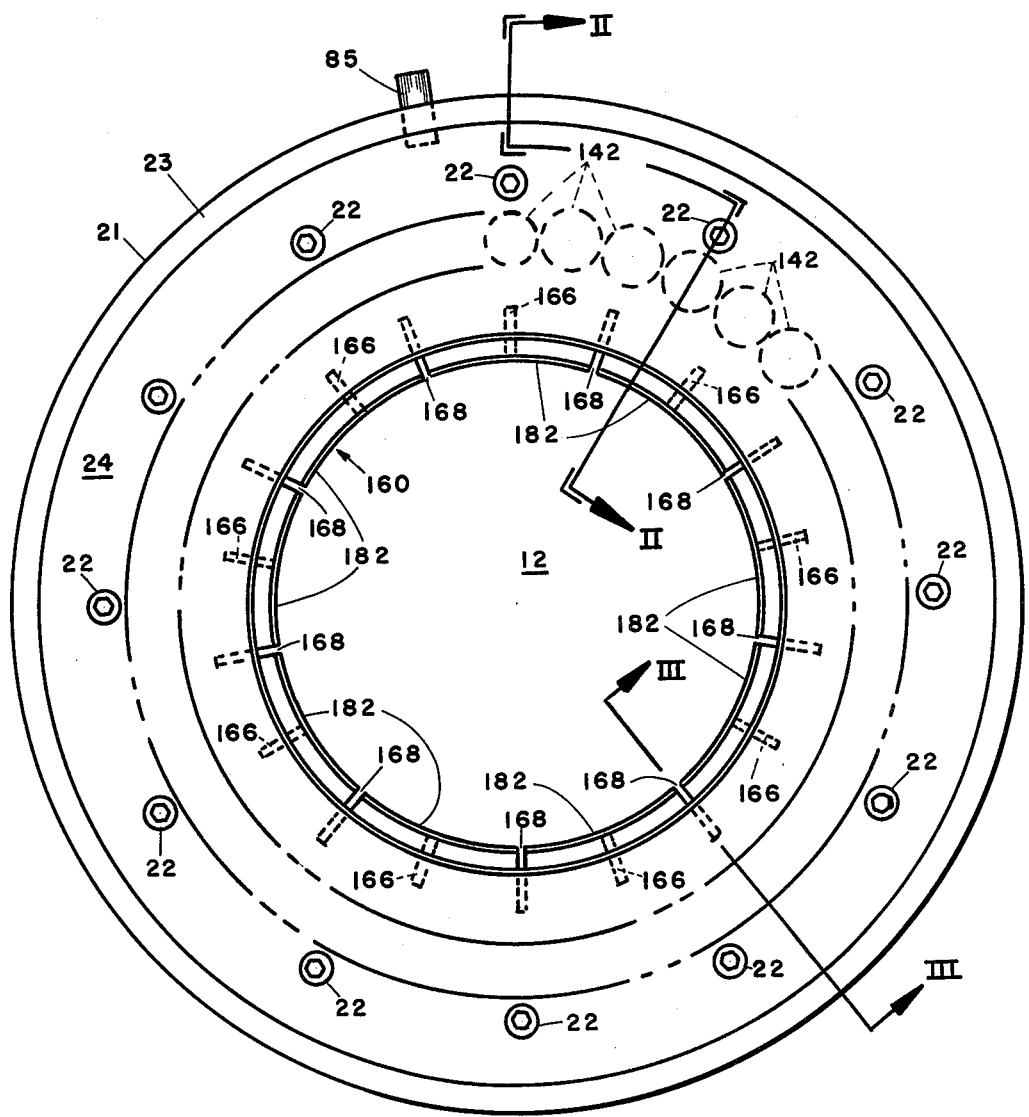
FIG. 1 is a right end view of a collet chuck embodying the present invention.

The chuck 10 includes an annular collet retainer 20 secured to a generally cylindrical body 40 by means of a plurality of bolts. At the opposite end of the body 40 there is secured a spindle adapter 60 also secured to the body by means of a plurality of bolts 62. Body 40, retainer 20 and spindle adapter 60 are generally cylindrical in shape including central openings through which a workpiece can extend. Thus the chuck 10, as best seen in FIG. 1, includes a relatively large, axially extending opening 12 for passing a workpiece therethrough. Mounted to the body 40 between members 20 and 60 is a slip ring assembly 80 and piston housing assembly 100. Assemblies 80 and 100 are secured to one another by means of a plurality of bolts 82 extending around the periphery thereof. A pair of bearings 122 and 124 provide the rotational intercoupling of the rotating body 40 to the stationary assemblies 80 and 100 respectively.

Figure 2:
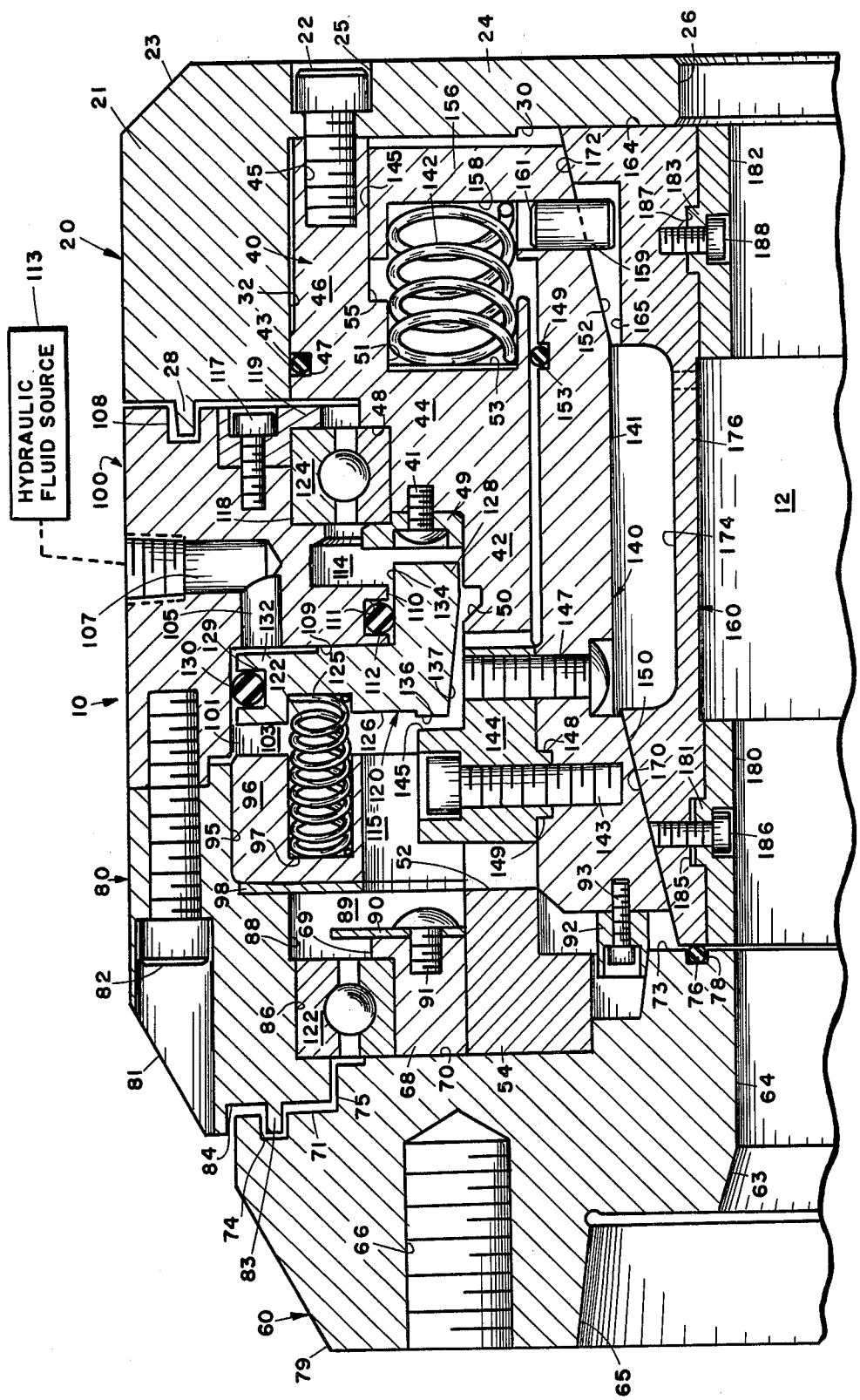
FIG. 2 is a fragmentary enlarged cross-sectional view of the upper portion of the collet chuck shown in FIG. 1 taken along the section lines II—II of FIG. 1.
Figure 3:
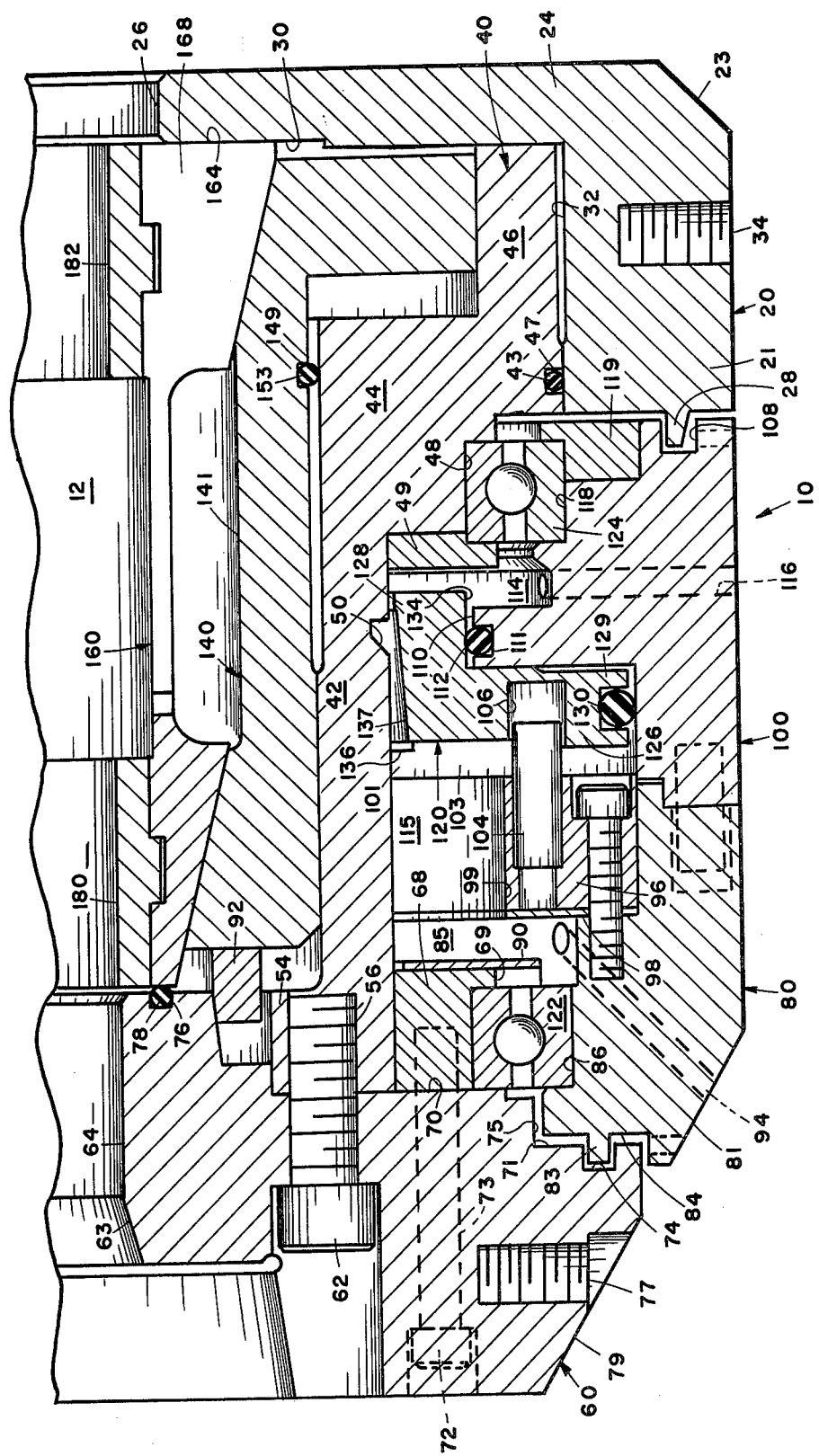
FIG. 3 is an enlarged fragmentary cross-sectional view of the lower portion of the collet chuck shown in FIG. 1 taken along the section lines III—III of FIG. 1.
Figure 4:
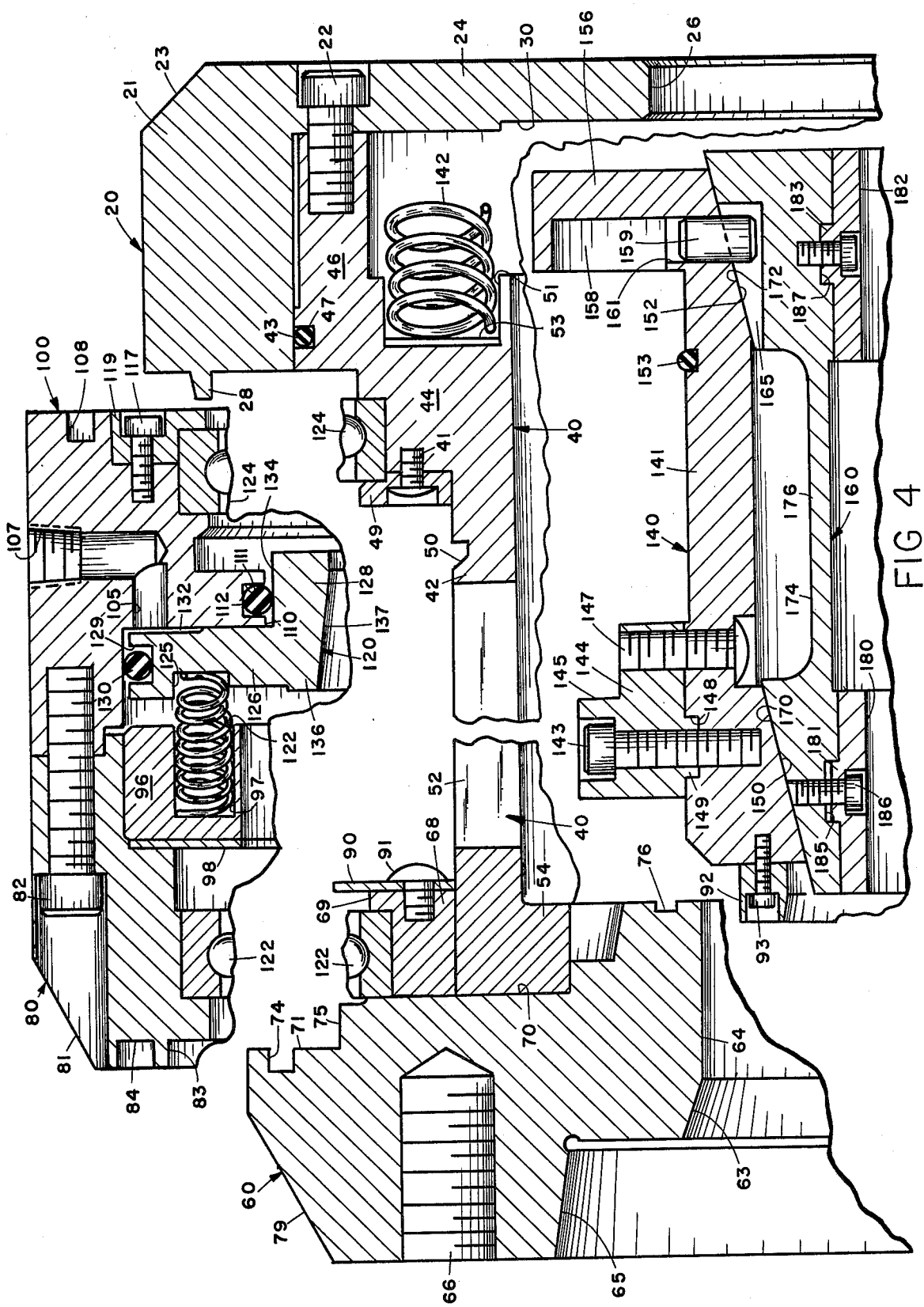
FIG. 4 is an exploded fragmentary cross-sectional view of the upper portion of the collet chuck shown in FIG. 2.

A piston 120 is supported within the piston housing 100 and is positioned to move axially acting against an actuator slide assembly 140 slidably mounted within the inner periphery of body 40 and including a camming surface engaging the collet 160. A plurality of circumferentially spaced heavy-duty compression springs 142 extend between body 40 and the actuator 140 urging it to the right as seen in FIGS. 2 and 3 forcing collet 160 radially inwardly to a workpiece clamping position. Piston 120 on the other hand when actuated by hydraulic pressure urges actuator 140 in the opposite direction compressing springs 142 releasing the compressive force on collet 160 to release the workpiece. Having briefly described the overall assemblies and their interrelationship, a detailed description of the collet chuck is now presented.

Referring now to the Figures and in particular to FIGS. 2 and 3, the collet retainer 20 includes an axially extending cylindrical body 21 with a radially inwardly extending end 24 the junction of which forms a beveled surface 23. Extending axially through end 24 is a central aperture 26 having a diameter in the preferred embodiment of approximately 9 inches to accommodate workpieces up to approximately this diameter. Extending from the end of body 21 remote from end 24 is an annular projection 28 which projects into an annular recess 108 formed in the piston housing 100 to form in combination therewith a labyrinth seal protecting against entry of coolant employed in machining operations. Bolts 22 spaced at equal intervals around the periphery of retainer 20 secure the retainer to body 40 as seen in FIG. 1 and are countersunk within apertures 25. The inner surface of end 24 includes a disc-shaped seating surface 30 serving as a stop against which the annular end surface 164 of collet 160 abuts as shown in the Figures.

Retainer 20 includes a large opening 32 formed in body 21 for receiving and capping the remaining elements of the collet chuck as best seen in FIGS. 2 and 3. At the lower end of retainer 20 there is provided a threaded aperture 34 (FIG. 3) serving as means for attaching a lifting bolt for handling the chuck. Thus the collet retainer 20 serves not only to retain the collet 160 in place within the chuck but also as a protective end cap for the inner mechanism of the chuck.

The chuck body 40 as best seen in FIG. 3 includes a generally cylindrical body portion 42 extending axially from the spindle adapter 60 at one end and subsequently radially outwardly towards the opposite end at flange 44 and again axially to the retainer end 46. The retainer end 46 of body 40 includes a plurality of threaded apertures 45 (FIG. 2) spaced equally around the periphery for receiving the retainer bolts 22. On the outer cylindrical wall of end 46 there is formed a rectangular peripheral recess 47 for receiving therein an O-ring 43 sealing the junction of the cylindrical wall of opening 32 of retainer 20 and the outer cylindrical wall of the retainer end 46 of chuck body 40.

End 46 of the body 40 also includes 36 equally spaced circular apertures 51 (FIG. 2) drilled axially therein for receiving one end of the 36 compression springs 142. A spacer insert 53 is provided in the floor of apertures 51 to provide precompression of the springs 142 where desired or necessary. The inner wall of end 46 of body 40 includes an axially extending annular recess 55 for receiving an axially extending spring enclosing flange 145 of the actuator or slide member 140.

A first annular bearing receiving seat 48 is formed in the axially extending portion 44 of body 40 for receiving the inner race of bearing 124. An annular bearing retaining collar 49 secures the opposite surface of bearing 124 within seat 48 by means of bolts 41. An annular configurated coolant trap 50 spaced axially forwardly from bearing seat 48 is machined on the outer cylindrical surface of body 40 as seen in FIGS. 2 and 3.

Eight equally spaced elongated apertures 52 (FIG. 2) are formed radially through the cylindrical wall 42 of the chuck body permitting the projection of an actuator pad 144 through the body and its axial motion within aperture 52.

The forward end of chuck body 40 includes a radially inwardly extending flange 54 including a plurality of equally spaced threaded apertures 56 (FIG. 3) for receiving the securing bolts 62 which secure the spindle adapter 60 to the chuck body 40. Thus it is seen that chuck body 40 extends from one end of the chuck to the other end and provides means for securing the retainer 20 and spindle adapter 60 to the chuck as well as providing an axially fixed member against which the clamping springs 142 can act.

The spindle driver adapter 60 is a generally collar-shaped structure which is adapter to mount the collet chuck to a spindle of a machine for providing rotation to the collet chuck and thence to the workpiece through the collet. Adapter 60 includes an axially extending central aperture 64 having a diameter greater than that of the maximum size workpiece for use with the chuck. The end of aperture 64 is outwardly flared at 63 to permit the workpiece to be easily inserted therethrough. Further, an enlarged recess area 65 is formed in the end of adapter 60 for receiving the end of the spindle drive. A plurality of threaded apertures 66 (FIG. 2) are spaced equally in the front end of the adapter for securing the spindle drive to adapter 60. A bearing retainer collar 68 having a radially outwardly extending flange 69 secures the inner race of bearing 122 against rear surface 70 of the spindle adapter 60. Retainer 68 in turn is held in place by a plurality of circumferentially spaced bolts 72 (FIG. 3) extending through apertures 73 in adapter 60.

Adapter 60 further includes an annular recess 74 for receiving an annular projection 83 in spaced relationship from the slip ring assembly 80 thereby forming a labyrinth seal tending to prevent coolant from entering the internal portions of the chuck. The labyrinth seal formed by recess 74 and projection 83 also includes the step-cut surfaces 71 and 75 formed on adpater 60 and extending alternately, radially, inwardly and axially. An annular recess 76 is formed radially outwardly from aperture 64 on the rear surface of adapter 60 to receive an O-ring seal 78 to provide a sealing interface between the adapter 60 and the radially movable collet 160. Adapter 60 also includes a threaded aperture 77 (FIG. 3) for attachment of a lifting bolt for handling the chuck. The outer edge 79 of the adapter is beveled.

Adapter 60 thus provides mechanical coupling of the chuck to the drive spindle of the machinery with which the chuck is employed for rotating the adapter, body and retainer 20 as well as actuator slide 140 and collet 160 mounted thereto. The slip ring 80 and piston housing 100 as well as the piston 120 however remain stationary since they are mounted to the outer race of bearings 122 and 124. These elements are now described in detail.

The purpose of slip ring 80 and piston assembly 100 is to provide a stationary portion of the rotating chuck to which the hydraulic line as well as lubricating lines can be secured. These assemblies are positioned between the adapter 60 and retainer 20 in spaced relationship with the labyrinth seals between the interfaces such that there is no physical contact between these assemblies and the rotating end members. Bearings 122 and 124 provide the rotational coupling of the slip ring assembly and the piston assembly 100 to the body 40 and spindle adapter 60.

The slip ring assembly 80 comprises a cylindrical collar having a beveled forward surface 81. The front of the collar includes a first annular recess 84 into which an annular portion of the adapter 60 extends. Spaced radially inwardly from the edge of recess 84 is annular projection 83 extending into recess 74 of the adapter 60 forming the labyrinth. A second recess 86 formed in slip ring 80 from a side opposite recess 84 defines a bearing seat for receiving the outer race of bearing 122. Axially to the right of recess 86 in FIGS. 2 and 3 there is formed another annular recess 88 having a diameter greater than recess 86 to define an annular chamber 89 therein for receiving the radially spaced slinger 90 secured to bearing retainer 68 by means of bolts 91. The slinger is an annulus.

Within chamber 89 there is also positioned an annular resilient molded Silastic seal 92 secured to the forward surface of assembly 140 by means of a plurality of equally spaced bolts 93 as seen in FIG. 2. Communicating with space 89 and formed through slip ring 80 is a coolant drain aperture 94 (FIG. 3) for draining any coolant which may pass the labyrinth intercoupling of adapter 60 and slip ring 80. Slinger 90 serves to force any such coolant out through drain 94. Seal 92 prevents the coolant from entering the lubricated slide assembly 140 from chamber 89.

Axially to the right of annulus recess 88 in FIGS. 2 and 3 there is formed an enlarged aperture which receives an annular spring retaining collar 96 mounted within recess 95 against an annular spacer washer 98. Collar 96 includes a plurality of circumferentially spacer apertures 97 for receiving one end of springs 122 (FIG. 2) which provide counterpressure against the piston 120 holding the stationary piston away from the rotating actuator pads 144 when the piston is not actuated under hydraulic pressure. Collar 96 includes a plurality of circumferentially spaced step-cut apertures 99 for receiving a plurality of dowel pins 104 (FIG. 3) which extend into aligned apertures 106 in piston 120 preventing rotation of the piston as described more fully below. Recess 95 and the central opening in annular collar 96 defines a central axially extending chamber 115 permitting motion of the actuator 140 therein. An antirotation pin 85 (FIG. 1) extends radially outwardly from the slip ring assembly to prevent rotation of the slip ring and piston housing assemblies 80 and 100 respectively. Pin 85 is thus adapted to fit within a notch in the machinery in which the chuck is employed.

The piston housing 100 is a generally collar-shaped structure having an axially formed cylindrical aperture 101 extending therein from the left end as seen in FIGS. 2 and 3 for receiving piston 120. On the end of aperture 101 defining cylinder wall 103 there is provided a hydraulic fluid conduit 105 communicating with a radially extending tapered aperture 107 threaded to receive a standard hydraulic fitting for coupling a pressurized source of hydraulic fluid 113 to the right side of piston 120. The pressurized source of hydraulic fluid provides, When applied to actuate the piston, hydraulic fluid at a pressure of approximately 425 p.s.i.

The floor 109 of cylinder 101 includes an axially extending aperture 110 the sidewalls of which include an annular recess 111 for receiving an O-ring 112 for sealing the interface between the surface of aperture 110 and surface 134 of piston 120. Axially to the right of aperture 110 there is formed in housing 100 an annular chamber 114 including a coolant drain aperture 116 (FIG. 3) permitting draining of any lubricant which may seep into the chamber through the labyrinth seal between housing 100 and retainer 20. The outer race of bearing 124 is fitted in a bearing seat 118 formed axially from the right end of piston housing 100 and bearing 124 is held therein by means of an annular bearing retainer collar 119 secured to housing 100 by means of a plurality of bolts 117 (FIG. 2). As noted above, the piston housing 100 is secured to slip ring 80 by means of a plurality of bolts 82 equally spaced and extending around the circumference of the chuck.

Piston 120 comprises an annular member having a disc-shaped piston head 126 with an axially extending cylindrical flange 128 extending rearwardly from the inner edge of head 126 within chamber 114. The front surface of piston head 126 includes a plurality of circumferentially spaced apertures 125 (FIG. 2) each forming a seat for one of the plurality of compression springs 122. Springs 122 thereby act to hold the piston 120 in the rearward position shown in FIGS. 2 and 3. Alternatively spaced with apertures 125 are a plurality of additional apertures 106 receiving an end of dowel pins 104 (FIG. 3) preventing rotation of the piston within the piston housing.

Along the outer peripheral edge of the piston head 126 there is provided an annular recess 129 which receives an O-ring seal 130 sealing the outer periphery of the piston to the cylinder wall 103. The rear surface of piston head 126 includes a machined annular recess 132 aligned with conduit 105 for providing a flow path for hydraulic fluid even with the piston in its extreme rearward position shown in FIGS. 2 and 3. The space behind the piston head is sealed by means of O-ring 112 engaging the outer cylindrical surface 134 of the cylindrical flange 128 of the piston.

Thus the hydraulic fluid is sealed in the space behind the piston by means of O-rings 112 and 130 such that when pressure is applied to the piston it moves axially to the left as shown in FIGS. 2 and 3 and when the hydraulic pressure is released, springs 122 force the piston rearwardly into the position shown in these Figures. The junction of head 126 and flange 128 includes an annular acutator engaging surface 136 for engaging the contact surfaces 145 of the eight spaced actuator pads 144. The inner surface 137 of the piston is tapered radially outwardly from rear to front to provide clearance between the rotationally stationary piston and the rotating actuator slide 140 while centrifugally forcing any coolant out towards drain 94.

Each of the eight spaced actuator pads 144 are coupled to the cylindrical slide body 141 of the actuator or slide assembly 140 by means of a pair of bolts 143 and 147 as seen in FIG. 2. Bolt 143 extends inwardly through the L-shaped actuator pad 145 and is recessed and threaded into the body 141 of the slide. A keyway 148 and correspondingly shaped projection 149 on the pad 144 assures positive alignment and a non-slip coupling of actuator pad 144 to slide body 141. Bolt 147 extends from the slide body outwardly into the actuator pad and is recessed as seen in FIG. 2.

The slide body is generally cylindrical in shape including a forward camming surface 150 which is a continuous, inclined surface extending from the edge of bolt 147 inwardly to the forward face of the slide body, the inclination of the surface should preferably be less than 20°, for example about 15°. The slide body includes a rear camming surface 152 similarly constituting the same angle of inclination tapered inwardly from the right end of the slide assembly towards its center.

The right end of the slide body 141 includes an outwardly radially projecting flange 156 having 36 equally spaced apertures 158 drilled therein for defining seats for springs 142. Thus springs 142 are compressibly held between apertures 51 in body 40 of the chuck and apertures 158 in the slide portion of the chuck thereby holding the slide in a clamping position to the right as shown in FIGS. 2 and 3. The inner periphery of slide body 141 includes a recess 149 for receiving an O-ring 153 sealing the interface between movable slide 140 and the axially stationary body 40 of the chuck.

The slide 140 thus is permitted to move axially (left and right in FIGS. 2 and 3) held in the extreme rightward position by compression springs 142 in a clamping position for the chuck and moves to the left by application of hydraulic pressure to piston 120 to release the chucking pressure.

Camming surfaces 150 and 152 of the slide assembly engage similarly shaped camming surfaces 170 and 172 of the collet 160. In order to prevent relative rotation between the annular cylindrical slide 140 and the similarly configurated collet 160, a dowel pin 159 (FIG. 2) is provided and extends between spaced apertures 161 extending radially in the slide as seen in FIG. 2 into correspondingly aligned slot 165 in the collet.

As seen in FIG. 1 the collet 160 includes nine axially extending slots 166 formed therethrough from the right-hand end a major portion of the axial length of the collet, for example, these slots could extend approximately two-thirds of the length of the collet. Alternately, nine staggered slots 168 of approximately the same length extend from the left-hand end of the collet towards the collet's right-hand end. These alternately staggered slots provide the approximately 0.120 inch motion required of the collet to deflect between clamping and releasing positions against the workpiece. In order to provide the desired deflectability, the center outer periphery of the collet 160 includes a recessed area 174 defining a relatively thin cylindrical wall 176 between the opposite camming ends of the collet.

Camming surfaces 170 and 172 are linearly inclined at an angle complementary to the cooperating surfaces 150 and 152 and are substantially continuous except for the key slot 165 described above. On the dinner surface of collet 160 at opposite ends there is provided a plurality of spaced removable jaw elements 180 and 182 secured to the collet by means of keys 181 and 183 respectively which fit within annular channels 185 and 187 respectively formed in the collet. Bolts 186 secure the jaw members 180 to the forward portion of the collet while bolts 188 secure the rear jaw members 182 to the collet. The jaw members can be a plurality of separate arcuate members as seen in FIG. 1 and have a thickness which varies significantly to permit the collet chuck to accommodate to various size workpieces. Thus for example in the preferred embodiment where the chuck had an outer diameter of 18 inches, the collet jaw inserts were available in sizes to permit a minimum 4 inch diameter workpiece to be held by the collet chuck and a maximum workpiece diameter of 8.779 inches.

The collet is axially restrained at the right end by surface 30 of the collet retainer 20 and at the left end by the surface 73 of the spindle adapter 60. Thus as the slide 140 moves left and right in the Figure, the wedging action of the mating camming surfaces causes the collet to move inwardly to a clamping position as the slide moves to the right as shown in FIGS. 2 and 3 and due to its natural resiliency, back to its workpiece releasing position when piston 120 compresses springs 142 releasing the clamping pressure. The mating camming surfaces are lubricated to provide a low friction interface between the slide and the collet. Conventional oil lubricating channels (not shown) provide oil to bearings 122 and 124 in a conventional manner.

Having described the construction of the improved collet of the present invention, a brief description of the operation of the collet chuck is now presented.

OPERATION

The collet chuck is installed in a machine such as a lathe or the like with which the chuck is employed by securing the spindle adapter 60 to the spindle employing the antirotation pin 85 (FIG. 1) of the slip ring extending into a suitable notch of the machine preventing its rotation. The hydraulic and lubrication lines are then coupled to the piston assembly. Depending upon the size of the workpiece, appropriate jaw members 180 and 182 are selected and secured to the collet as described above. Pressure is then applied to the piston 120 compressing return springs 122 as well as clamping springs 142. It is noted that the force exerted by the piston 120 against the plurality of return and compression springs is in the neighborhood of 22,000 pounds in the preferred embodiment. The chuck is then in an open position whereby the workpiece can be inserted into the axially extending aperture 12 of the chuck.

Once the workpiece is axially positioned, the hydraulic pressure is released and the piston returns to the position shown in FIGS. 2 and 3 and slide member 140 is forced to the right as shown in these Figures by the force of the 36 compression springs 142. This applies the clamping force of approximately 30,000 to 50,000 pounds depending upon the selected spring constant of compression springs 142. It is noted that the force on slide 140 due to the 36 springs 142 ranges from 10,000 to 16,000 pounds. This force is increased in about a ratio of 3:1 by the inclined camming surfaces between the slide 140 and collet 160. As the spindle of the lathe is rotated, the chuck elements 20, 40, 60, 140 and 160 rotate with the spindle thereby rotating the workpiece while the slip ring 80, piston assembly 100 and piston 120 therein remain stationary. The return springs 122 maintain the piston engaging surface 136 away from actuator pad surface 145 preventing wear at this interface during rotation of the workpiece.

It will become apparent to those skilled in the art that various modifications to the preferred embodiment described herein can be made without departing from the spirit and scope of the invention as defined by the appended claims.

The embodiments of the invention in which an exclusive property or privilege is claimed are defined as follows.

1. A collet chuck comprising:
    a chuck body having a spindle adapter mounted to one end and a collet retainer mounted to an opposite end; each of said body, spindle adapter and retainer including an axially extending aperture aligned with each other for the passage of a workpiece therethrough;
    a slip ring assembly rotatably mounted to said body between said adapter and retainer;
    an axially movable piston mounted to said slip ring assembly;
    a workpiece clamping collet positioned within said body; and
    actuator means slidably mounted to said body and engaging said collet and biasing it into clamping position; said piston when actuated engaging said actuator means and shifting it axially to release said collet.

2. The chuck as defined in claim 1 wherein said body includes a plurality of spaced spring seats formed in one end, said actuator means includes a portion facing said one end of said body and including a plurality of spaced spring seats aligned with said seats in said body and wherein said bias means comprises a plurality of springs compressibly held between said body and said actuator means within aligned spring seats to force said actuator into said collet engaging position.

3. The chuck as defined in claim 2 and further including additional spring means extending between said slip ring and said piston for holding said piston in a position spaced from said actuator means.

4. The chuck as defined in claim 3 wherein said actuator means comprises a generally cylindrical member having camming surface means, and wherein said collet includes corresponding camming surface means engaging said camming surface means of said actuator means.

5. The chuck as defined in claim 4 wherein said camming surface means comprises a first tapered cylindrical surface on one end of said actuator means and a second tapered cylindrical surface on an opposite end of said actuator means.

6. In a collet chuck having a body and workpiece holding collet mounted therein, the improvement comprising:
    an axially movable actuator slidably mounted to said body between said body and said collet, said actuator engaging said collet and means biasing said actuator to shift said collet into a workpiece clamping position;
    a piston cylinder surrounding said body and bearing means between said piston cylinder and said body permitting said body to rotate with respect to said piston cylinder;
    a piston mounted in said piston cylinder for movement axially thereof, said piston when actuated engaging said actuator for urging said actuator in a direction to release the force it normally applies to said collet.

7. In a collet chuck having a body and workpiece holding collet mounted therein, the improvement comprising:
an axially movable actuator slidably mounted to said body between said body and said collet, said actuator engaging said collet and means biasing said actuator to shift said collet into a workpiece clamping position;
a piston mounted to said body for movement axially thereof, said piston when actuated engaging said actuator for urging said actuator in a direction to release the force it normally applies to said collet; and
a ring member surrounding said body, bearing means mounting said ring member on said body, and wherein said piston is mounted on said ring member; said body, actuator, collet and biasing means being rotatable with respect to said ring member and piston.

8. The chuck as defined in claim 7 wherein said piston is a hydraulically actuated piston.

9. The chuck as defined in claim 8 wherein said biasing means comprises a plurality of compression springs extending between said body and said actuator.

10. The chuck as defined in claim 9 wherein said actuator means comprises a generally cylindrical member having camming surface means, and wherein said collet includes corresponding camming surface means engaging said camming surface means of said actuator means.

11. A collet chuck having a central opening through which a workpiece can be pressed axially, said chuck having a rotatable body and a collet mounted within said body for radial movement with respect thereto, axially movable camming means for shifting said collet radially inwardly to a workpiece clamping position, means for biasing said camming means against said collet and said collet into the workpiece clamping position; a slip ring assembly surrounding said body; a hydraulically operated piston mounted on said slip ring assembly for movement axially of said body and positioned to engage said camming means, said piston when extended under hydraulic pressure shifting said camming means into a collet releasing position for releasing a workpiece.

12. The chuck as defined in claim 11 wherein said camming means comprises a slide member having a tapered collet engaging surface and said biasing means comprises a plurality of springs extending between said body and said slide member.

13. The chuck as defined in claim 12 wherein bias means extending between said piston and said ring holds said piston in spaced relationship from said camming means when said piston is not actuated.

14. A collet chuck comprising:
a chuck body having a spindle adapter mounted to one end and a collet retainer mounted to an opposite end; each of said body, spindle adapter and retainer including an axially extending aperture aligned with each other for the passage of a workpiece therethrough;
a slip ring assembly rotatably mounted to said body between said adapter and retainer;
a piston housing rotatably mounted to said body adjacent said slip ring assembly, said piston housing including an axially movable piston therein;
a collet positioned within said body and including camming surface means;
actuator means slidably mounted to said body and including camming surface means engaging said camming surface of said collet; and
bias means extending between said body and said actuator means for forcing said actuator means in a direction to apply a clamping force on said collet, said piston engaging said actuator to release said clamping force when said piston is actuated.

15. The chuck as defined in claim 14 and further including additional bias means extending between said slip ring and said piston for holding said piston in a position shaped from said actuator means.

16. The chuck as defined in claim 15 wherein said body is generally cylindrical and including aperture means extending radially therethrough and wherein said actuator means includes actuating pad means extending through said aperture means between said slip ring and said piston.

17. The chuck as defined in claim 16 wherein said camming surface means comprises a first tapered cylindrical surface on one end of said actuator means and a second tapered cylindrical surface on an opposite end of said actuator means.

18. The chuck as defined in claim 17 wherein said body includes a plurality of spaced spring seats formed in one end, said actuator means includes a portion facing said one end of said body and including a plurality of spaced spring seats aligned with said seats in said body and wherein said bias means comprises a plurality of springs compressibly held between said body and said actuator means within aligned spring seats to force said actuator into said collet engaging position.

19. In a collet chuck including a body for receiving a workpiece holding collet, the improvement comprising:
an axially movable actuator slidably mounted to said body between said body and said collet, said actuator including a camming surface engaging said collet for applying a clamping force to said collet;
bias means extending between said body and said actuator for urging said actuator in a direction for applying a clamping force to said collet; and
bearing means rotatably mounting a piston assembly to said body and including a hydraulically operated piston, said piston actuatable to engage said actuator for urging said actuator in a direction to release the clamping force on said collet.

20. The chuck as defined in claim 19 wherein said body includes a plurality of spaced spring seats formed in one end, said actuator means includes a portion facing said one end of said body and including a plurality of spaced spring seats aligned with said seats in said body and wherein said bias means comprises a plurality of springs compressibly held between said body and said actuator means within aligned spring seats to force said actuator into said collet engaging position.

21. In a collet chuck including a body having a plurality of spaced spring seats formed in one end for receiving a workpiece holding collet, the improvement comprising:
an axially movable actuator slidably mounted to said body between said body and said collet, said actuator including a camming surface engaging said collet for applying a clamping force to said collet, said actuator means including a portion facing said one end of said body and including a plurality of spaced spring seats aligned with said seats in said body;

bias means extending between said body and said actuator for urging said actuator in a direction for applying a clamping force to said collet, said bias means comprising a plurality of springs compressibly held between said body and said actuator means within aligned spring seats to force said actuator into said collet engaging position;

a piston assembly mounted to said body and including a hydraulically operated piston, said piston actuatable to engage said actuator for urging said actuator in a direction to release the clamping force on said collet; and additional spring means coupled between said body and said piston for holding said piston in a position spaced from said actuator when said piston is not actuated.

22. A collet chuck comprising:

an annular body including a plurality of spaced apertures formed in one end for receiving one end of a plurality of springs;

an annular actuator slidably mounted within said body, said actuator including a flange extending radially outwardly at one end and including a plurality of spaced spring receiving apertures for receiving the opposite ends of said springs, said actuator including a camming surface for engaging a collet whereby said springs force said actuator to a collet clamping position;

a collet secured within said body and including camming surface means engaging said camming surface of said actuator; and a piston assembly rotatably coupled to said body by bearing means said assembly including a hydraulically operated piston movable when actuated to engage said actuator for moving said actuator in a direction in opposition to said springs for releasing the collet clamping pressure.

23. The chuck as defined in claim 22 wherein said body includes aperture means extending radially therethrough and wherein said actuator includes actuator pad means extending through said aperture means to contact said piston when actuated.

* * * * *

UNITED STATES PATENT AND TRADEMARK OFFICE
CERTIFICATE OF CORRECTION

PATENT NO. : 4 094 521
DATED : June 13, 1978
INVENTOR(S) : Charles Piotrowski

It is certified that error appears in the above-identified patent and that said Letters Patent are hereby corrected as shown below:

Column 3, line 37:
"adapter" should be --adapted--

Column 4, line 49:
"annulas" should be --annular--

Column 4, line 54:
"Spacer" should be -- spaced --.

Column 5, line 13:
", When" should be --, when--

Column 5, line 42:
"Alternatively" should be --Alternately--

Column 6, line 66:
"dinner" should be --inner--

Column 9, line 32:
"pressed" should be --passed--

Signed and Sealed this

Thirteenth Day of March 1979

[SEAL]

Attest:

RUTH C. MASON
Attesting Officer

DONALD W. BANNER
Commissioner of Patents and Trademarks